United States Patent [19]

Bowden, Jr.

[11] 4,348,547

[45] Sep. 7, 1982

[54] ELECTRICAL OUTLET BOX WITH RECESSED PORTS

[75] Inventor: Wade R. Bowden, Jr., Northport, N.Y.

[73] Assignee: Slater Electric Inc., Glen Cove, N.Y.

[21] Appl. No.: 200,423

[22] Filed: Oct. 24, 1980

[51] Int. Cl.³ .............................................. H02G 3/08
[52] U.S. Cl. .................................... 174/65 R; 220/3.2
[58] Field of Search .............................. 174/53, 65 R; 220/3.2–3.94

[56] References Cited

U.S. PATENT DOCUMENTS

| | | | |
|---|---|---|---|
| 3,770,873 | 11/1973 | Brown | 174/53 X |
| 3,863,021 | 1/1975 | Schindler et al. | 174/53 |
| 3,863,037 | 1/1975 | Schindler et al. | 220/3.9 X |
| 4,202,457 | 5/1980 | Tansi | 174/65 R X |
| 4,265,365 | 5/1981 | Boteler | 174/53 X |

FOREIGN PATENT DOCUMENTS 1396790  6/1975  United Kingdom ............. 174/65 R

Primary Examiner—B. A. Reynolds
Assistant Examiner—D. A. Tone
Attorney, Agent, or Firm—Morgan, Finnegan, Pine, Foley & Lee

[57] ABSTRACT

An electrical outlet box includes a set of cable entry ports arranged along a wall of the box. One of the ports is recessed inwardly of the box wall by a recessed wall portion, or shelf, formed adjacent a port structure associated with mounting wiring devices to the box. The recessed wall portion provides sufficient space to permit cable-clamping closure structures adjacent each port.

17 Claims, 7 Drawing Figures

ELECTRICAL OUTLET BOX WITH RECESSED PORTS

BACKGROUND OF THE INVENTION

Electrical outlet boxes are widely used in the construction industry for providing access to electric power in homes, office buildings and factories. The outlet boxes are constructed in a number of sizes, generally in accordance with industry standards to support the desired number of wiring devices at any given wall location. The boxes are also constructed with a sufficient volume to permit termination of the cable conductors to the desired wiring devices to provide access to electric power throughout the building. In order accommodate the dual functions of providing a power outlet as well as the joining of wires, the outlet boxes are provided, in accordance with an industry standard, with a predetermined number of cable entry ports by which the wires are brought into and out of the outlet box.

To facilitate deployment of the outlet boxes, the cable entry ports are provided with closure means to prevent the entry of debris when the ports are not used. In the case of a metal box, partially attached discs close the ports but are readily removable from the box by a sharp blow or a prying tool. In the case of molded plastic boxes, each port may be closed with a removable panel member which is attached to the rim of the ports.

Recently, Slater Electric Inc. (the assignee of the present application) has developed a new closure structure for moldable electrical outlet boxes, which not only closes the unused port but also permits easy opening by the force exerted by a cable and can provide automatic clamping of the cable when inserted through the port. These structures are disclosed in commonly assigned co-pending applications Ser. Nos. 879,767 (filed Feb. 21, 1978), 22,993 (filed Mar. 22, 1979) and 200,422 (filed Oct. 24, 1980), which are hereby incorporated by reference.

The aforesaid structures are easily molded and can provide a unique integrally formed outlet box. Thus, it is highly desirable to incorporate such structures in all the ports of various size outlet boxes. One problem can arise in realizing this desire.

In order to provide such structures, particularly the self-clamping type structure, adjacent each cable entry port, there must be sufficient structural strength in the immediately adjacent wall structure to withstand the cable-clamping forces that will be transmitted to the wall by the panel member(s) making up the closure structure. In addition, there may be a physical problem in that there might not be enough surface area in the wall to accommodate such closure structures in all the cable entry ports formed in the wall.

Accordingly, it is an object of the present invention to provide a new and improved outlet box structure adapted to permit incorporation of the aforesaid improved cable entry port closure structures at every entry port in any single wall of the outlet box, while satisfying industry standards for the size of the ports, the strength of the closure structures, etc.

SUMMARY OF THE INVENTION

In accordance with the invention, an electrical outlet box is formed with at least one recessed wall portion in each sidewall member which has cable entry ports formed therein, with a cable entry port formed in each recessed wall portion and closure panel means attached to the recessed wall portion about the rim of the port. The recessed wall portion defines a steplike structure in the box, intersecting the backwall, to provide a rigid base for supporting the closure panel means adjacent the port.

It will be found that, in accordance with the invention, sufficient space is provided to form all the ports required by the industry codes for each box wall, with cable-clamping closure panel means at each port, as well as providing sufficient rigidity to its adjacent wall structure to withstand any forces transmitted by the closure panel means to the sidewall by electrical cable(s) inserted through the port in the recessed wall portion.

It will be understood that the foregoing general description as well as the following detailed description are exemplary and explanatory of the invention but are not restrictive thereof. The accompanying drawings, referred to herein and constituting a part hereof, illustrate preferred embodiments of the invention and, together with the detailed description, serve to explain the principles of the invention.

BRIEF DESCRIPTION OF THE DRAWINGS

The aforementioned aspects and other features of the invention are explained in the following description taken in connection with the accompanying drawings wherein.

DETAILED DESCRIPTION OF THE PREFERRED EMBODIMENT

Figure 1:
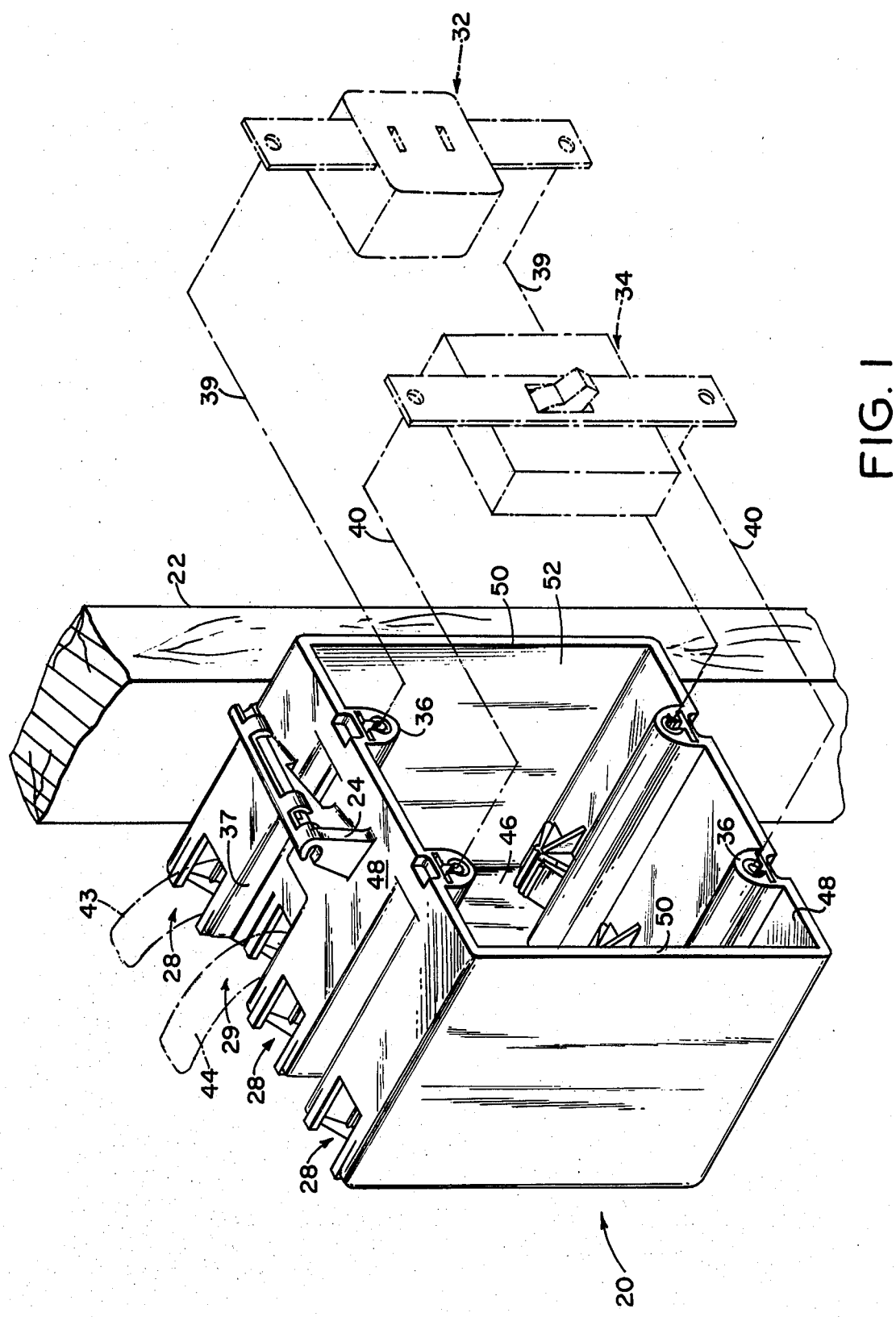
FIG. 1 is an isometric view of an outlet box formed in accordance with the present invention.
Figure 2:
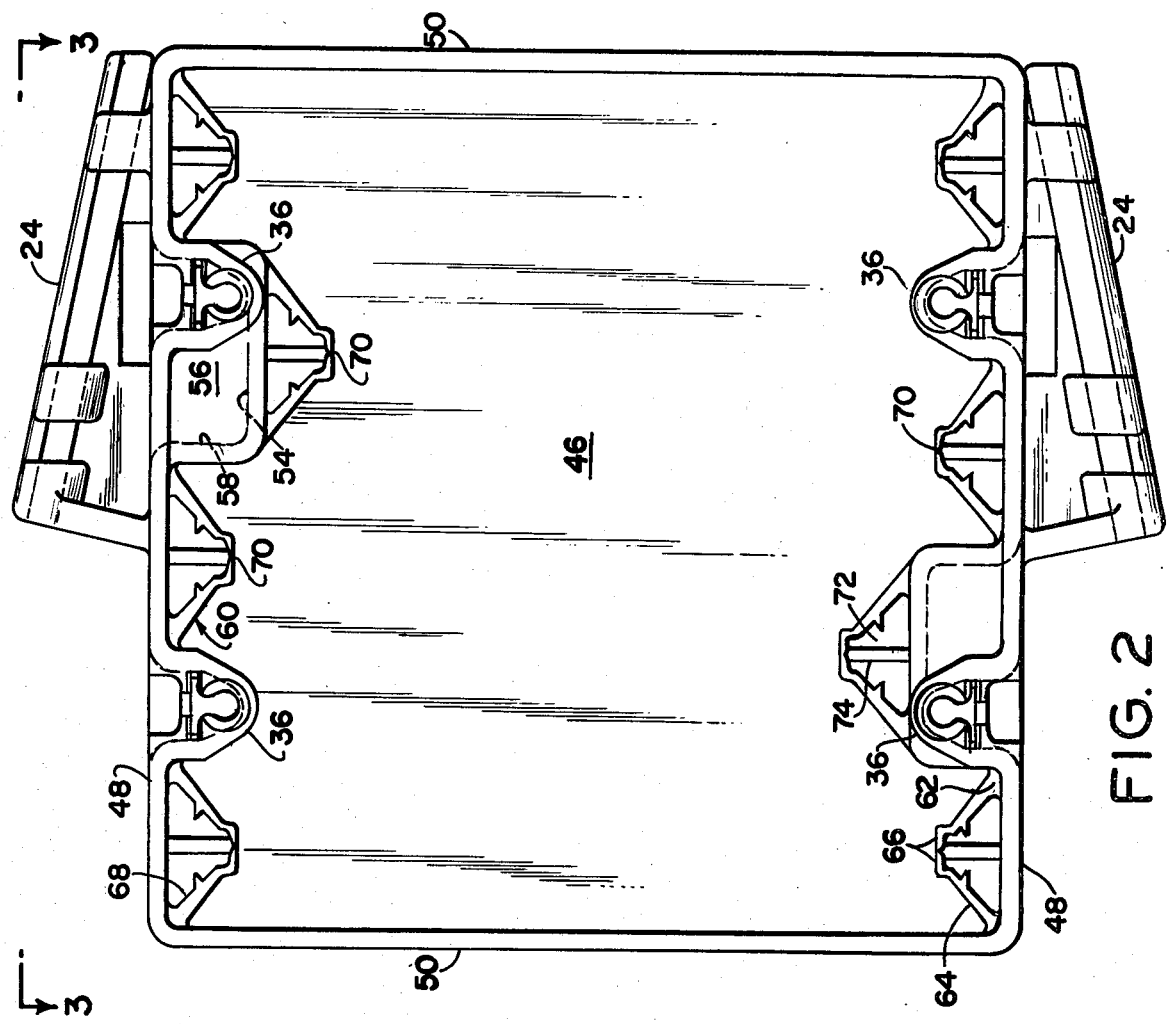
FIG. 2 is an elevation view of the front of the outlet box of FIG. 1.
Figure 5:
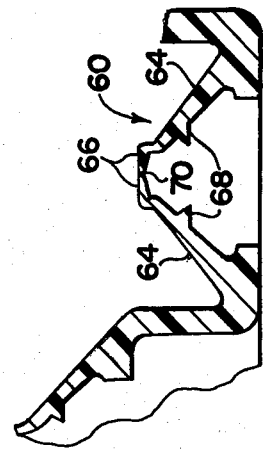
FIG. 5 is a fragmentary sectional view of a cable entry port of the outlet box taken along the line 5—5 in FIG. 3.
Figure 3:
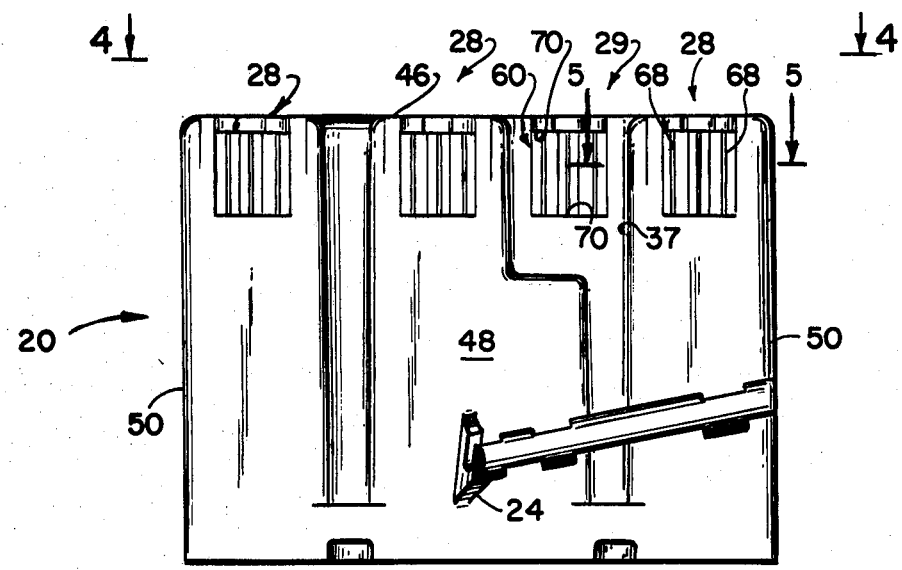
FIG. 3 is an end view of the outlet box taken along the line 3—3 in FIG. 2.
Figure 4:
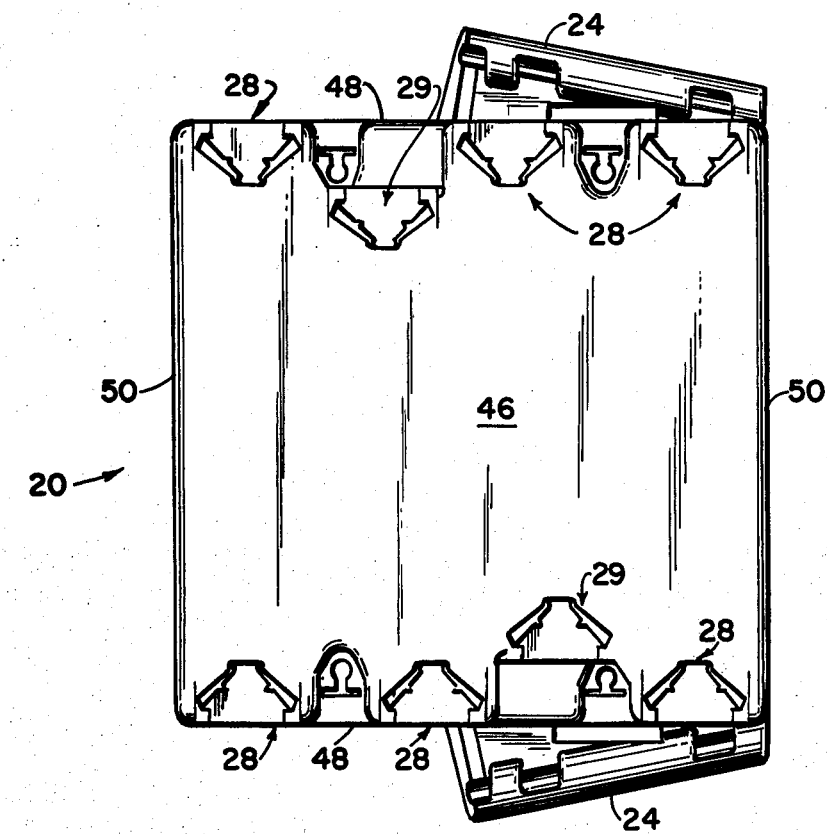
FIG. 4 is an elevation view of the rear of the outlet box of FIG. 1.

Referring now to FIG. 1, an electrical outlet box 20 incorporating the invention is shown secured to a wall stud 22 of a structure to provide or control access to electrical power. To this end, a nail (not shown) may be held in a bracket 24 which is integrally formed with the box 20, and thence hammered into stud 22.

The box 20 (here, a double-gang box) is provided with four cable entry ports in each of the opposite endwalls of the box 20. Three of the ports (each indicated at 28) are formed directly in the box wall, while a fourth port, 29 is recessed inwardly of the box, as will be described more fully hereinafter. The box 20, including the bracket 24 and the ports 28-29, are readily formed by a molding process using an injection moldable thermoplastic resin such as disclosed in the aforesaid commonly assigned applications.

By way of example of the use of the box 20, there are shown, in phantom, an electrical receptacle 32 and an electrical switch 34. The double-gang box 20 shown permits the simultaneous securing of a socket 32 and a switch 34 to mounting posts 36 which may also be conveniently formed integrally with the box 20, as described in commonly assigned U.S. Pat. Nos. 4,188,854; 4,105,862 and 3,955,403. Dashed lines 39-40 indicate the positioning of the socket 32 and the switch 34 for attachment to the box 20. After mounting the socket 3 and the switch 34 to the box 20, a cover plate (not shown) is then secured over the socket 32 and the switch 34 to close off the box 20 in a conventional manner.

Electrical cables are brought into the box 20 by the ports 28-29 to provide electrical connection with the socket 32 and the switch 34. Two exemplary cables 43-44, shown in phantom, enter the box 20 by two of the ports, the cable 43 entering by a port 28 while the cable 44 enters by a recessed port 29.

A feature of the invention is the recessing of the port 29 substantially deeper into the box 20 than the wall surrounding ports 28. Since the sizes of electrical outlet boxes are generally set by standards in the electrical industry, the cross sectional dimensions of, and the number of, the ports 28-29 are preset to accommodate the preset sizes of the electrical cables. The double-gang box 20 includes four cable-entry ports on opposite endwalls 48 of the box. If ports were closed by a simple single closure panel, there would undoubtedly be no difficulty fitting all four ports on each endwall. However, the cable-clamping closure panel structures disclosed in said commonly assigned copending applications utilize more surface area in the side-to-side direction of the endwall than the simple closure panels—so much so that four such closure structures might not fit side-by-side on the endwall.

Referring then to FIGS. 2, 3, 4 and 5, the structure of the box 20 (utilizing the structure of the invention) is shown in greater detail. The box 20 is formed of a bottom wall 46, and end walls 48 and side walls 5 upstanding therefrom. The top edges of end walls 48 and side walls 50 are equally spaced from the bottom wall 46 to form a continuous frontal edge defining a front opening 52 of the box 20. The endwall 48 also supports posts 36 which are adapted to receive the clip members of the aforesaid commonly assigned patents, for mounting the desired wiring device to the box.

To facilitate molding the clip-receiving structures, the posts 36 are formed by an indentation within the end wall 48, with the indentation extending through the complete height of the end wall 48 (except for the clip-receiving portion) and into the bottom wall 46. Thereby, the box 20 can be readily removed from a two-part injection mold utilized in the fabriction of box 20.

To provide space for the port 29 on each endwall, the ports 29 are recessed a sufficient distance within the end wall 48 so as to locate the ports 29 inwardly of their respective end walls 48 at depths approximately even with the inner surface of the posts 36. To this end, port 29 is formed on a recessed wall portion, or shelf, 54 of the end wall 48. The shelf 54 is recessed from the remainder of end wall 48 by transverse wall segments 56 (parallel to bottom wall 46), longitudinal wall segments 58 (parallel to side walls 50) and the non-adjacent wall segment 37 forming post 36. The depth of such recessing is equal to about the depth of post 36, as is evident from FIGS. 1 and 2. Thus, part of the wall making up one side of the post 35 is eliminated but the opposite wall segment 37 serves to provide rigidity to the recessed wall portion 54 to withstand stresses generated in the closure structures.

The ports 28-29 are here formed with closure means 60 (FIG. 5) which comprise a pair of tapered panels 64, disposed angularly towards each other, with the inner surfaces (facing each other) of each pair of panels 64 being angled at smaller angle relative to each other than the outer surfaces of the panels 64, as described more fully in the aforesaid commonly assigned applications. Each of the panels 64 of the ports 28 are cantilevered at their thickened base portions 62 to the end wall 48 while the panels 64 of ports 29 are cantilevered at their base portions 62 to the recessed wall segment 54. Each pair of panels includes a doubly tapered web member 66 and the top end of each port (28 or 29) is closed by wall segment 72 which is reinforced by rib 74, also as described in the aforesaid co-pending applications.

Each panel 64 may also include a tooth 68 in the form of a transverse rib along the inner surface of the panel, the teeth 68 of opposed panels facing each other to provide secondary grasping means. The centerline (70) of each web 66 may be prefractured as described in commonly assigned co-pending application Ser. No. 200,422 (filed Oct. 24, 1980), the disclosure of which is hereby incorporated by reference.

Figure 6:
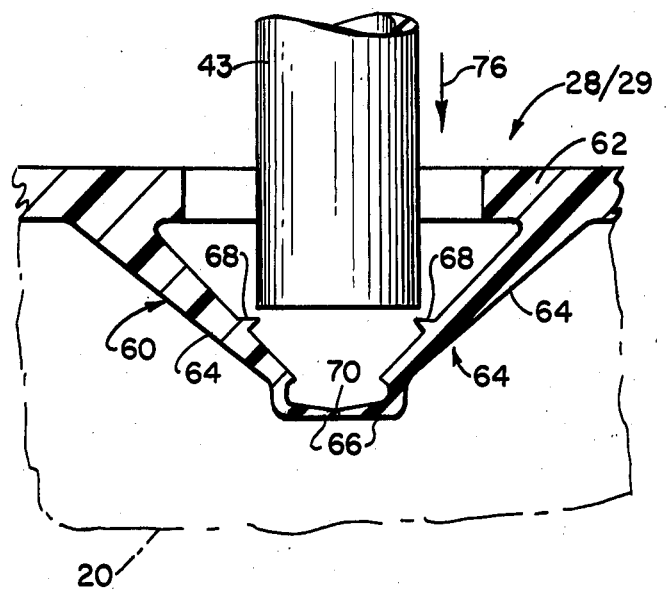
FIG. 6 shows a cross-sectional view of cable entry port with an electrical cable prior to insertion of the cable into the port.
Figure 7:
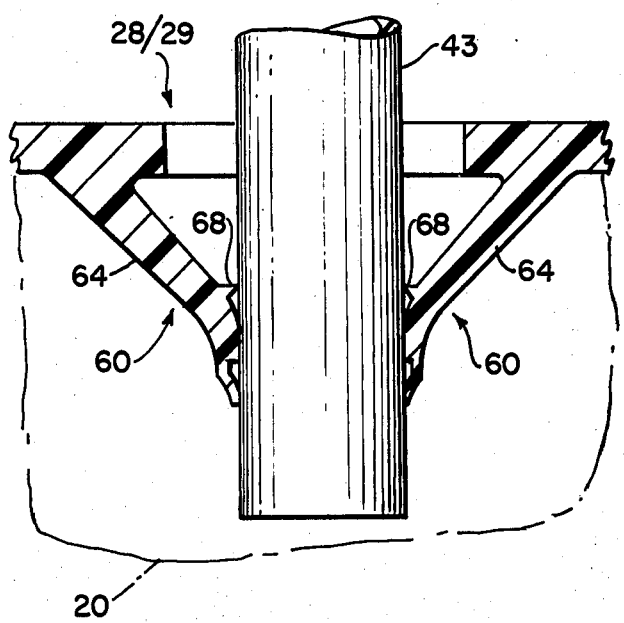
FIG. 7 shows the cable entry port of FIG. 6 after insertion of the electrical cable through the port.

FIGS. 6 and 7 illustrate the entry of the cable 43 into the box 20 by a cable entry port 28 or 29. In FIG. 6, the end of cable 43 is shown immediately prior to contacting the panels 64 and webbing 66, as the cable advances in the direction of arrow 76. In FIG. 7, the cable 43 has entered the port 28 by pushing the panels 64 apart. The webs 66 and/or the teeth 68 grasp the outer sheath of the cable 43, as described in the aforesaid commonly assigned co-pending applications.

Since the panels 64 deform no more than is necessary for the entry of cable 43, they provide a minimal opening in the port to inhibit the entry of foreign objects, such as dust or other particulate matter, into the outlet box 20. Moreover, the panels 64 also prevent removal of the cable 43 from the box 20, once grasped between their opposite edges, as described in said applications.

It will be understood, therefore, that the walls (37, 56 and 58) by which shelf 54 is recessed in the box provide sufficient rigidity to support the closure panels 64 mounted about the cable entry port formed in the wall segment 54 and to withstand the stresses generated in the panels when flexed to clamp a cable, while providing sufficient room to fit four cable entry ports with clamping-type closure means, or the like, and the insert-supporting post 36 on the same endwall. Each shelf 54 is parallel to its corresponding end wall 48 so that the orientation of the port 29 therein relative to the box 20 is the same as that of the remaining ports 28 in the set of ports situated on that end wall. By recessing each port 29 to the same depth as its adjacent post 36, the port 29 can be situated in overlapping arrangement with the posts 36 so as to reduce the overall space required and thereby accommodate the arrangement of the ports to the length of the end wall 48.

It is to be understood that the above-described embodiment of the invention is illustrative only, and that modifications thereof may occur to those skilled in the art. For example, any of the cable entry port closure means disclosed in said commonly assigned applications can be incorporated at port 29 in wall segment 54, in addition to the two-panel clamping structures disclosed herein. Accordingly, this invention is not to be regarded as limited to the embodiment disclosed herein, but rather is found within the scope and spirit of the appended claims.

What is claimed is:

1. An improved electrical outlet box having a backwall and an essentially continuous sidewall upstanding therefrom to define a hollow box chamber interior thereof and generally open along front edges of the sidewall, wherein the improvement comprises:

a plurality of cable entry ports formed in a portion of the sidewall, said sidewall portion being of predetermined width and each said cable entry port adapted to provide access to the box chamber for an electrical power cable;

cable entry port closure means associated with each said cable entry port for generally closing its associated cable entry port when not used to provide access for the cable;

one of said cable entry ports and its associated closure means being recessed inwardly of said box chamber relative to the other cable entry ports in said sidewall portion, such that sufficient spacing is provided to accommodate all of said plurality of cable entry ports and associated closure means within said predetermined width with greater strength in said sidewall portion than if none of said plurality of cable entry pors were recessed, thereby maximizing the number of said cable entry ports formed in said sidewall portion without reducing wall strength necessary to satisfy industry standards.

2. An electrical outlet box according to claim 1, wherein said closure means include generally self-clamping clamping means for resisting removal of an electrical power cable inserted through its associated cable entry port when acted on by a force tending to remove the cable from the box.

3. An electrical outlet box according to claim 1, wherein said closure means is essentially self-opening by forcing an end of an electrical power cable against said closure means.

4. An electrical outlet box according to claim 2 or 3 wherein said closure means comprises panel means depending angularly into the box chamber from an interior wall surface portion adjacent its corresponding cable entry port.

5. An electrical outlet box according to claim 4 wheren said panel means include a pair of panel members depending angularly towards each other from generally opposite sides of said cable entry port.

6. An electrical outlet box according to claim 5, wherein said recessed cable entry port and associated closure means are formed as a result of recessing a segment of said sidewall portion and forming a cable entry port and closure means therein.

7. An electrical outlet box according to claim 6, which further includes a mounting post located on said sidewall portion, adjacent said recessed wall segment, and wherein said recessed wall segment extends, at least in part, from said mounting post.

8. An electrical outlet box according to claim 1, 2 or 3, wherein said recessed cable entry port and associated closure means are formed as a result of recessing a segment of said sidewall portion and forming a cable entry port and closure means therein.

9. An electrical outlet box according to claim 8, which further includes a mounting post located on said sidewall portion, adjacent said recessed wall segment, and wherein said recessed wall segment extends, at least in part, from said mounting post.

10. An electrical outlet box according to claim 1, 2 or 3, further comprising a mounting post located on said sidewall portion, interspaced among said plurality of ports for mounting an electrical wiring device to the box and wherein each said recessed port and associated closure means are recessed to about the same depth as said mounting post.

11. An electrical outlet box according to claim 1, 2 or 3, wherein said recessed cable entry port is located at an intersection of the backwall with the sidewall.

12. An electrical outlet box comprising:

a wall structure having a backwall and a sidewall contiguous therewith defining a generally hollow box chamber interior thereof;

a plurality of cable entry ports formed along at least one portion of said wall structure;

closure means associated with each said cable entry port, each said closure means being adapted to be opened to permit entry of an electrical power cable through its associated cable entry port;

a mounting post on said sidewall and extending from the front to the backwall of said box and interspaced among said plurality of ports, one of said cable entry ports being located generally at the back of said box adjacent said mounting post and being recessed inwardly of the box wall structure to about the same depth as that of the mounting post to provide sufficient space for said plurality of ports along said wall portion with a said closure means adjacent each port.

13. An electrical outlet box according to claim 12, wherein said recessed port is formed in a portion of said wall which is recessed inwardly of the box.

14. An electrical outlet box according to claim 13, wherein said recessed wall portion extends, at least in part, from said post formed on said wall.

15. An electrical outlet box according to claim 14, wherein each said recessed port includes port closure panel means about the rim of said recessed cable entry port for accommodating the entry of a cable therethrough.

16. An electrical outlet box according to claim 15, wherein said port closure panel means are adapted to grasp an electrical cable when inserted into the box through said recessed port.

17. An electrical outlet box according to claim 16 wherein said panel means include frangible web means which can be fractured by forcing the end of the electrical cable against said closure panel means.

* * * * *

UNITED STATES PATENT AND TRADEMARK OFFICE
CERTIFICATE OF CORRECTION

PATENT NO. :   4,348,547
DATED      :   September 7, 1982
INVENTOR(S) :  WADE R. BOWDEN, JR.

It is certified that error appears in the above—identified patent and that said Letters Patent is hereby corrected as shown below:

Claim 1, Column 5, line 26,   "pors" should read --ports--.

Claim 5, Column 5, line 48,   "wheren" should read --wherein--.

Signed and Sealed this

Twelfth Day of June 1984

[SEAL]

Attest:

Attesting Officer

GERALD J. MOSSINGHOFF
Commissioner of Patents and Trademarks